Dec. 15, 1964     J. F. SAPP, SR     3,161,147
VEHICLE UNDERFRAME
Filed June 10, 1963     6 Sheets-Sheet 1
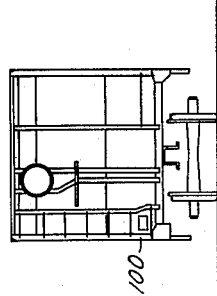
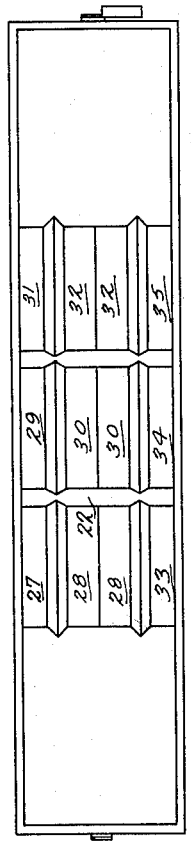
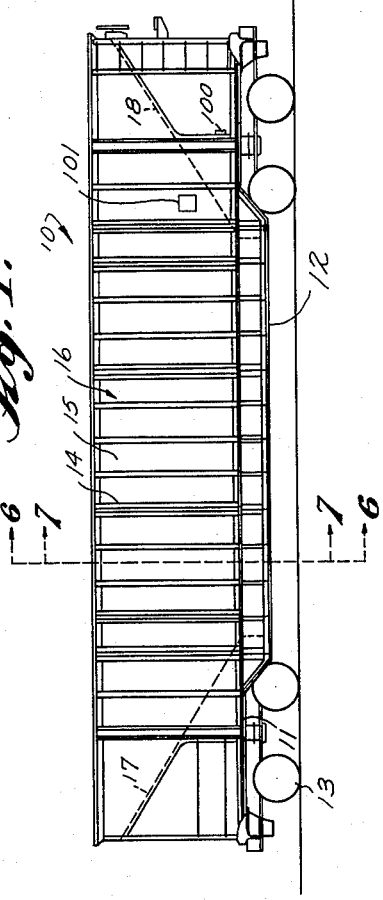
INVENTOR.
JULIAN F. SAPP, SR.
BY
Cushman, Darby & Cushman
ATTORNEYS Dec. 15, 1964 J. F. SAPP, SR 3,161,147
VEHICLE UNDERFRAME Filed June 10, 1963 6 Sheets-Sheet 2

INVENTOR.
JULIAN F. SAPP, SR
BY
Cushman, Darby & Cushman
ATTORNEYS

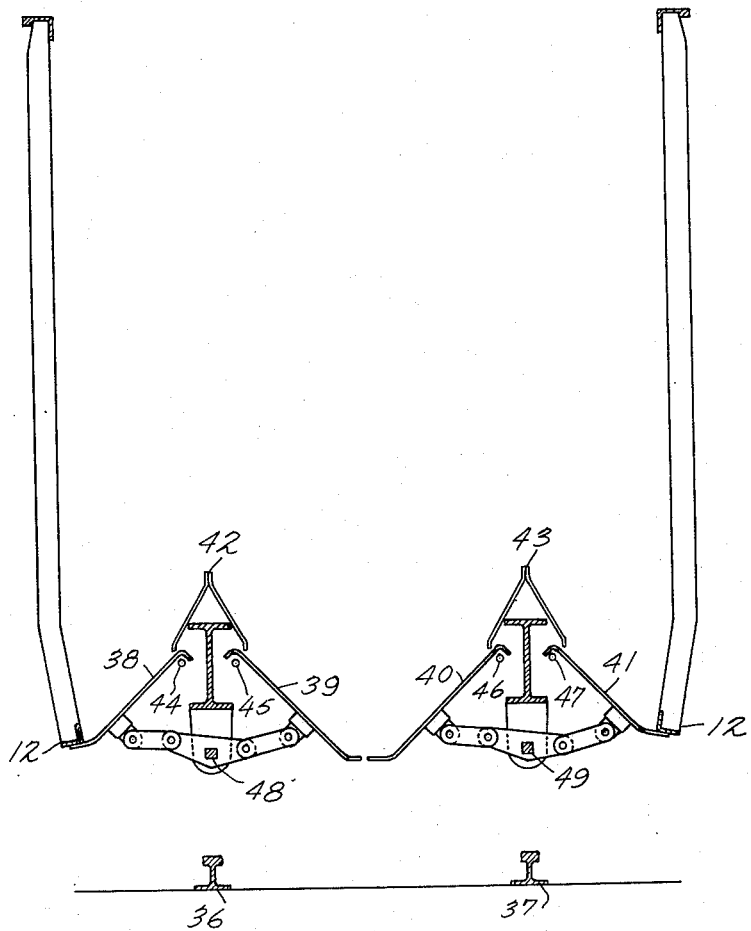

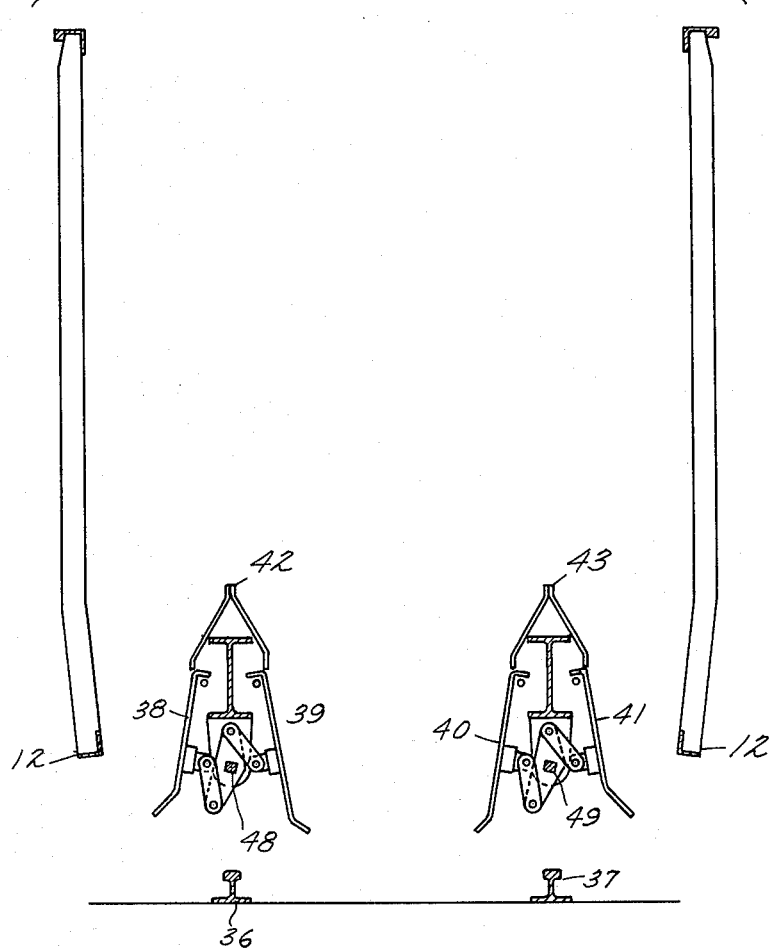

Dec. 15, 1964  J. F. SAPP, SR  3,161,147
VEHICLE UNDERFRAME
Filed June 10, 1963  6 Sheets-Sheet 5

INVENTOR.
JULIAN F. SAPP, SR
BY
Cushman, Darby & Cushman
ATTORNEYS

Dec. 15, 1964  J. F. SAPP, SR  3,161,147
VEHICLE UNDERFRAME
Filed June 10, 1963  6 Sheets-Sheet 6

INVENTOR.
JULIAN F. SAPP, SR
BY
Cushman, Darby & Cushman
ATTORNEYS

United States Patent Office 3,161,147
Patented Dec. 15, 1964

3,161,147
VEHICLE UNDERFRAME
Julian F. Sapp, Sr., Louisville, Ky., assignor to Louisville and Nashville Railroad Company, a corporation of Kentucky
Filed June 10, 1963, Ser. No. 286,853
5 Claims. (Cl. 105—250)

This invention relates to vehicle underframe structures and assemblies and more particularly to improved construction of an underframe structure of railway cars, especially hoppers, the improvement permitting more readily and more completely dumping of the lading through the bottom of the hopper without requiring the use of car shakers or other devices associated with conventional hopper-type cars.

Conventional hopper-type cars also experience numerous other disadvantages which are essentially overcome by the present invention. Some of these disadvantages are: that the angle of the sloped floor sheets does not lend itself to rapid unloading of the lading; that the material used in the construction of the sloped floor sheets is such that a frozen load will adhere to the floor sheet, thus preventing the lading from sliding over it; that the angle of the door openings with respect to the lading does not allow sufficient vertical clear opening to permit the lading to drop out the bottom of the car when the doors are open. These disadvantages, amongst others, generally necessitate the use of car shakers, vibrators or other similar devices to free the lading. The use of such devices, however, causes damage to the car structure and requires considerable expenditures in time and labor. In addition, conventional type hopper cars are generally so constructed that the arrangement of the underframe structure and the doors permit the lading to be dumped onto the rail of the track. This arrangement is obviously disadvantageous, especially where it is desirable to unload the car automatically while it is in motion.

It is therefore a primary object of this invention to provide an underframe structure for vehicles, particularly railway cars and more particularly hopper cars, which will permit unloading in a minimum time without the use of a car shaker or other device to aid in the unloading process.

Another object of this invention is to provide an underframe structure for hopper cars which will permit unloading even while the car is in motion.

Yet another object of this invention is to provide an underframe structure with hopper doors so associated therewith to permit unloading of the lading without dumping the lading on the rail of the track.

Other objects and attending advantages will be pointed out in the course of the detailed description relating to a preferred embodiment of the invention, the same being disclosed in the accompanying drawings in which:

FIGURE 1 is a side elevation view of a hopper car embodying the invention.

FIGURE 2 is an end view of the hopper car.

FIGURE 5 is a plan view of the hopper car showing the door arrangement.

FIGURE 6 is a sectional view of the car taken on line 6—6 of FIGURE 1 and shows the door arrangement (closed) and associated underframe.

FIGURE 7 is a sectional view of the car taken on line 7—7 of FIGURE 1 and shows the door arrangement (open) and associated underframe.

Figure 3:
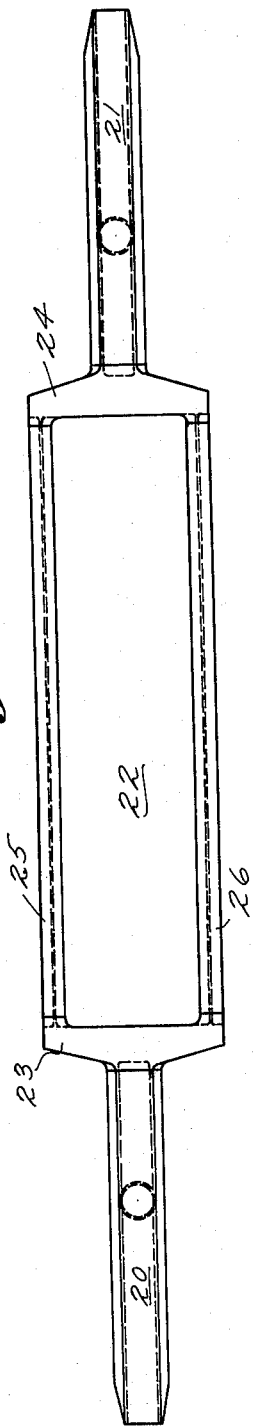
FIGURE 3 is a plan view of the underframe structure of the car.

Referring now to the several views of the drawings and particularly to FIGURE 1 and FIGURE 2, the invention is embodied in a railway car 10 comprising side sill 11, side sill reinforcement 12, and supporting truck structures which include wheels 13 and other parts not shown. Side stakes 14 extend upwardly from side sill 11 and side sill reinforcement 12 and have secured to the inner faces thereof the side plates 15 which constitute the side walls of the hopper 16 in which materials are stored or shipped. This hopper is closed at its ends preferably by sloping end plates 17 and 18 and is open at its top although a roof structure provided with filling hatches and hatch covers could be provided, if desired.

Figure 4:
FIGURE 4 is a side view of the underframe structure.

Referring now to FIGURES 3 and 4, the preferred form and structural arrangement of the present vehicle underframe generally indicated at 19, consists of a pair of center draft sills 20 and 21, one at each end of the car 10 and extending toward the longitudinal center of the car 10 just beyond the truck area. There is no center draft sill in the door area 22. The center draft sills 20 and 21 are headed off at the door area 22 by header sills 23 and 24, respectively. These header sills transmit impacts and other forces from the center draft sills 20 and 21 at the ends of the car to the intermediate sills 25 and 26 which are the main supporting members of the underframe of the car in the door area 22. This underframe structure makes it possible to arrange the doors under the car 10 so as to protect the rails from the lading when the doors are opened.

Referring now to FIGURE 5, the door area 22 is provided with door openings 27–35 which are so arranged that, when the doors are opened, the lading is spilled therebetween and on both sides of the rails 36 and 37 of the track. The rails 36 and 37 of the track are directly under the intermediate sills 25 and 26 of the car.

Referring now to FIGURE 6, doors 38, 39, 40, and 41 are provided for door openings 27, 28, and 33 respectively, it being noted that single opening 28 is provided with doors 39 and 40. Door openings 29, 30, and 34, as well as openings 31, 32, and 35 are similarly provided with door arrangements described above. The doors 38–41 are hinged to both sides of the intermediate sills 25 and 26 which are provided with sill caps 42 and 43 at points 44, 45, 46, and 47, respectively. The doors as shown are in the closed and locked position. The outside edge of the outside doors 38 and 41 close against the bottom of the side sill reinforcements 12 of the car while the center doors 39 and 40 close together. Rotation in a counter-clockwise direction of door operating shafts 48 and 49, connected to doors 38–39, and 40–41, respectively, through a pair of levers with hinged lever arms, the extremities of which are hingedly secured to the doors, causes the doors to drop open and take the position shown in FIGURE 7 which illustrates more clearly the lading being dumped between and on the outside of the rails 36 and 37.

Figure 8:
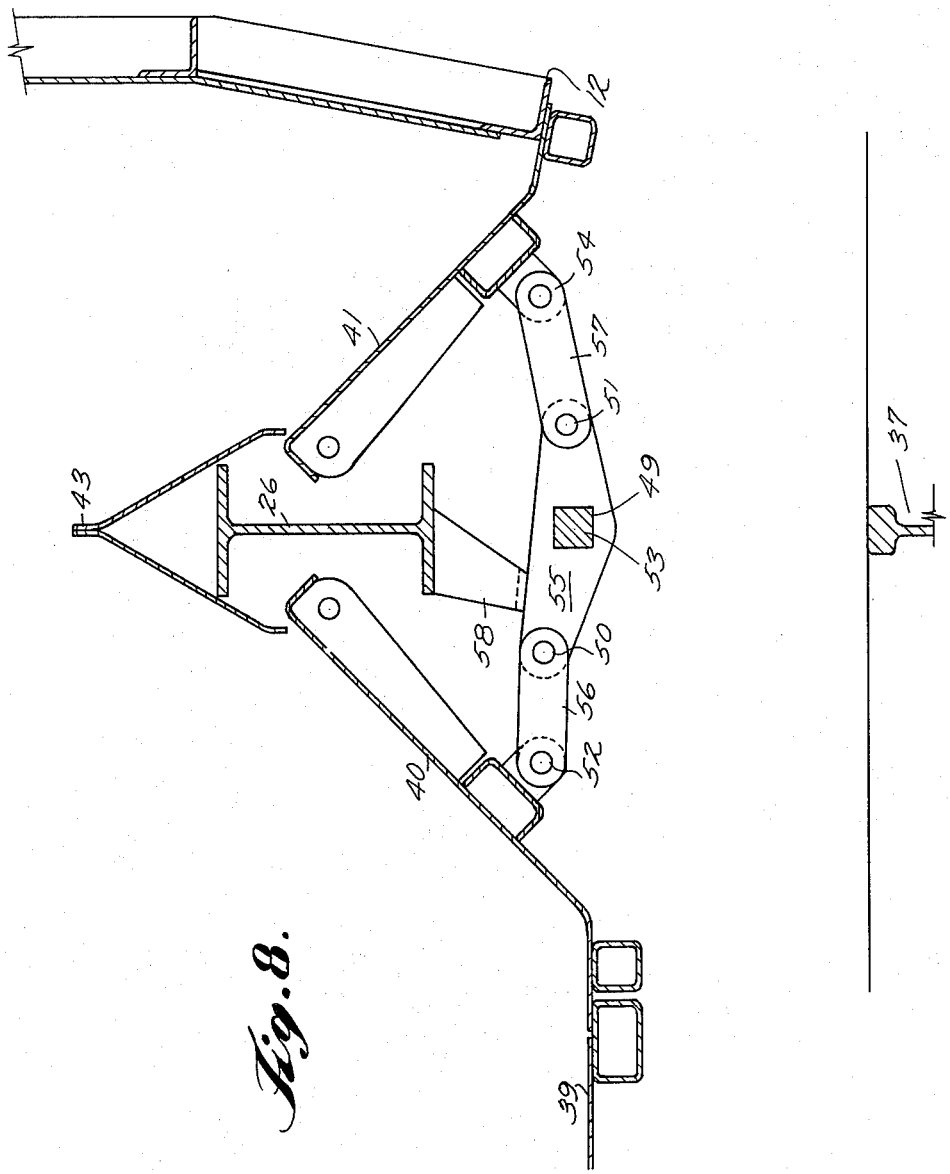
FIGURE 8 is an enlarged view of the door operating levers, shaft and doors in the closed and locked position which is shown on the right side of FIGURE 6.

As shown in FIGURE 8, the doors 40 and 41 are locked by means of hinge points 50 and 51, respectively, moving in the clockwise direction until it moves beyond the center line between the centers of the extreme hinged points 52–53 and 53–54, of the lever 55 and lever arms 56 and 57. The weight of the doors 40 and 41 or the weight of the doors and the lading above the doors causes the lever 55 to be forced in the clockwise direction against the stop 58 which is secured to the underside of the intermediate sill 26. To unlock the doors 40 and 41 and drop them to the position shown in FIGURE 9, a counter clockwise rotation of shaft 49 moves hinge points 50 and 51 beyond the center line between the centers of the extreme hinged points 52–53 and 53–54 of the lever 55 and the arms 56 and 57, thus allowing the doors to fall open and assume the open position shown in FIGURE 9.

Figure 9:
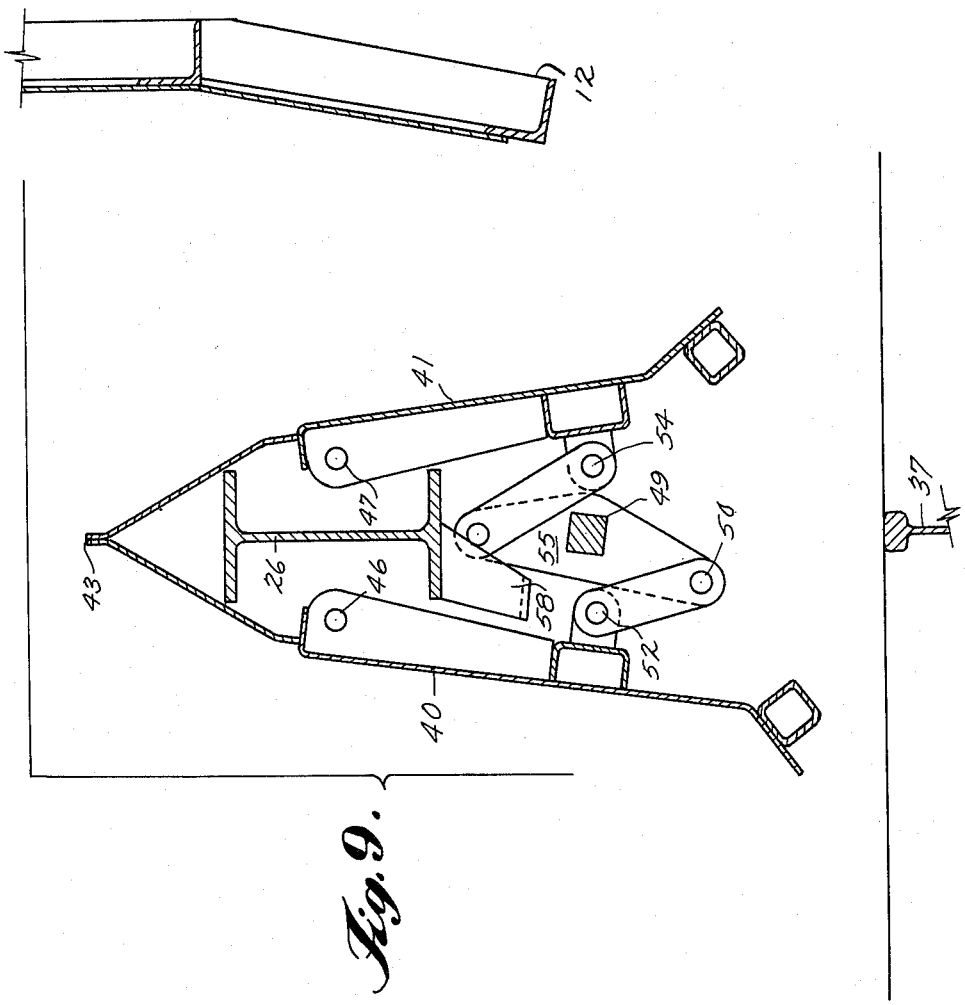
FIGURE 9 is an enlarged view of the door operating levers, shaft and doors in the open position which is shown on the right of FIGURE 7.

To close and lock the doors which are shown in FIGURE 9, a clockwise rotation of the door operating shaft 49 is effected, thus moving hinged points 50 and 51 until they move beyond the center lines between the centers of extreme hinged points 52–53 and 53–54 of the lever 55 and arms 56 and 57. This then completes one full cycle of the door operation which starts with the doors in the closed and locked position and ends with them in the same position.

Although one form of the invention has been shown and described by way of illustration, it will be understood that it may be constructed in various other embodiments which come within the scope of the appended claims.

What is claimed is:

1. In a vehicle underframe, the combination: of forward and rearward center draft sills, said sills having ends extending toward the longitudinal center of said vehicle; forward and rearward header sills fixedly attached to said ends of said forward and rearward center draft sills extending toward the longitudinal center of said vehicle; a pair of intermediate sills in vertical alignment with rails over which said underframe is disposed, said intermediate sills secured to and separating said header sills to form an aperture at the longitudinal center of said car, said aperture bounded by said intermediate sills and said header sills.

2. In a vehicle underframe, the combination: of forward and rearward center draft sills, said sills having ends extending toward the longitudinal center of said vehicle; forward and rearward header sills fixedly attached to said ends of said forward and rearward center draft sills extending toward the longitudinal center of said vehicle, a pair of intermediate sills in vertical alignment with rails over which said underframe is disposed, said intermediate sills secured to and separating said header sills to form an aperture at the longitudinal center of said car; a pair of doors hingedly fixed to opposite sides of each intermediate sill, one of the pair of doors attached to each of said intermediate sills providing a cover for said aperture at the longitudinal center of said car.

3. In a hopper car underframe structure provided with a pair of side sills including side sill reinforcements, the combination: of forward and rearward center draft sills, said sills having ends extending toward the longitudinal center of said vehicle; forward and rearward header sills fixedly attached to said ends of said forward and rearward center draft sills extending toward the longitudinal center of said vehicle, a pair of parallel intermediate sills in vertical alignment with rails over which said underframe is disposed, said intermediate sills secured to and separating said header sills to form an aperture at the longitudinal center of said hopper, a pair of doors hingedly fixed to opposite sides of each intermediate sill; one of the pair of doors fixed to each of said intermediate sills providing a cover for said aperture at the longitudinal center of said car; the other of the pair of doors engageable with said side sills.

4. The combination of claim 3 having a plurality of a pair of doors hingedly fixed to said intermediate sills.

5. The combination of claim 4 wherein said aperture extends longitudinally to the trucks of said hopper car.

References Cited by the Examiner
UNITED STATES PATENTS

| | | | |
|---|---|---|---|
| 1,066,531 | 7/13 | Rohlfing | 105—250 |
| 1,342,085 | 6/20 | Batho | 105—248 |
| 1,522,624 | 1/25 | Hart | 105—251 |
| 1,628,924 | 5/24 | Sheehan | 105—415 |
| 1,634,107 | 6/27 | Hosceit et al. | 105—243 |
| 1,942,702 | 1/34 | Hosceit | 105—251 |
| 2,047,289 | 7/36 | Pflager et al. | 105—249 |

LEO QUACKENBUSH, *Primary Examiner.*